United States Patent
McLean et al.

(10) Patent No.: US 7,624,561 B2
(45) Date of Patent: Dec. 1, 2009

(54) WINDROW MERGER LIFT MECHANISM

(75) Inventors: Kenneth W. McLean, New Holland, PA (US); Robert L. Rice, New Holland, PA (US); David M. DeChristopher, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/949,967

(22) Filed: Dec. 4, 2007

(65) Prior Publication Data

US 2009/0139196 A1    Jun. 4, 2009

(51) Int. Cl.
*A01D 43/00* (2006.01)
(52) U.S. Cl. ........................................................ 56/192
(58) Field of Classification Search ................... 56/192, 56/375, 153, 189, 181, 366, 370
See application file for complete search history.

(56) References Cited

U.S. PATENT DOCUMENTS

| | | | | |
|---|---|---|---|---|
| 2,761,270 A | * | 9/1956 | Blaser et al. | 56/370 |
| 3,149,449 A | * | 9/1964 | Mulder | 56/192 |
| 4,590,751 A | * | 5/1986 | Stephenson | 56/192 |
| 4,910,951 A | * | 3/1990 | Reilly et al. | 56/376 |
| 5,031,393 A | | 7/1991 | Rostoucher | |
| 5,351,468 A | | 10/1994 | Pominville | |
| 6,145,289 A | | 11/2000 | Welsch et al. | |
| 6,415,590 B1 | | 7/2002 | Lohrentz | |
| 6,679,038 B2 | | 1/2004 | Walch et al. | |
| 6,832,467 B2 | * | 12/2004 | Franet et al. | 56/192 |
| 6,907,719 B2 | * | 6/2005 | Ligouy | 56/15.1 |
| 7,028,459 B2 | | 4/2006 | Lohrentz et al. | |
| 7,310,929 B2 | * | 12/2007 | Dow et al. | 56/192 |
| 2007/0068131 A1 | | 3/2007 | Talbot et al. | |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A windrow merger lift mechanism having on a pair of rotational axes, skewed with respect to each other, to manipulate a merger apparatus between working and non-working positions. When the merger apparatus is in a first, or working position, the lift mechanism positions it to receive crop material from the conditioner rolls with minimal losses. When the merger apparatus is in a second, or non-working position, the lift mechanism positions the merger apparatus to allow crop material to be discharged from the header/conditioner with the same efficiency as a windrower having no installed merger attachment. The skewed axes of the merger lift mechanism optimize the merger position in both the working and non-working positions by moving the merger apparatus in four distinct, but related degrees of motion as the merger apparatus is moved between the positions.

7 Claims, 8 Drawing Sheets

WINDROW MERGER LIFT MECHANISM

BACKGROUND OF THE INVENTION

The present invention relates to agricultural windrowers and, more particularly, to a mechanism for conveying crop material to one side of a windrower to create merged windrows.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Current practice in agriculture is to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations, such as baling.

More current practice is to combine multiple windrows together as they are being mowed. This practice eliminates a raking operation and also reduces the number of passes of subsequent harvesting operations (e.g., chopping and baling). With the advent of higher capacity forage harvesters and balers, merging windrows is become a more desirable practice. Windrow merging attachments are thus becoming more prevalent on harvesting machines. However, merging windrows may not always be desirable when using harvesters having a windrow merging attachment installed. Currently known merger attachments are generally manually installed and positioned, thus selecting between conventional windrow and merged windrow operation requires windrower downtime to effect the change.

It would be a great advantage to provide a windrow merging attachment for a harvester that enabled an operator to selectively position the merging attachment between working and non-working positions while the windrower is operating thereby overcoming the above problems and disadvantages.

SUMMARY OF THE INVENTION

Accordingly, it is an object of the present invention to provide a windrow merger apparatus that is selectively positionable between working and non-working positions that allows crop material to be delivered to a desired location and in a desired configuration for subsequent harvesting operations.

It is a further object of the present invention to provide a lift mechanism for a windrow merger capable of positioning the merger apparatus in a working position to receive crop material from the conditioner rolls with minimal losses.

It is a further object of the present invention to provide a windrow merger lift mechanism capable of positioning the merger apparatus in a non-working position to allow crop material from the conditioner rolls with the same efficiency as a windrower having no installed merger attachment.

It is a further object of the present invention to provide a windrow merger lift mechanism capable of moving the merger apparatus about multiple axes in order to permit optimal merger position in both the working and non-working positions.

It is still further object of the present invention to provide a windrow merger lift mechanism having a simple linkage having minimal elements and bearings that is capable of positioning the merger apparatus about multiple axes.

It is a still further object of the present invention to provide a windrow merger lift mechanism capable of positioning the merger through the use of a single position actuator device.

It is a still further object of the present invention to provide a windrow merger lift mechanism capable of positioning a merger apparatus capable of protecting the lift mechanism from unintentional contact with the ground during windrow merging operations.

It is a still further object of the present invention to provide a windrow merger lift apparatus that is durable in construction, inexpensive of manufacture, carefree of maintenance, easily assembled, and simple and effective to use.

These and other objects are achieved by providing a windrow merger lift mechanism that relies on a pair of rotational axes, skewed with respect to each other, to manipulate a merger apparatus between working and non-working positions. When the merger apparatus is in the working position, the lift mechanism positions it to receive crop material from the conditioner rolls with minimal losses. When the merger apparatus is in the non-working position, the lift mechanism positions it to allow crop material to be discharged from the header/conditioner with the same efficiency as a windrower having no installed merger attachment. The skewed axes of the merger lift mechanism of the present invention optimize the merger position in both the working and non-working positions by moving the merger apparatus about four distinct, but related degrees of motion as the merger apparatus is moved between the positions.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
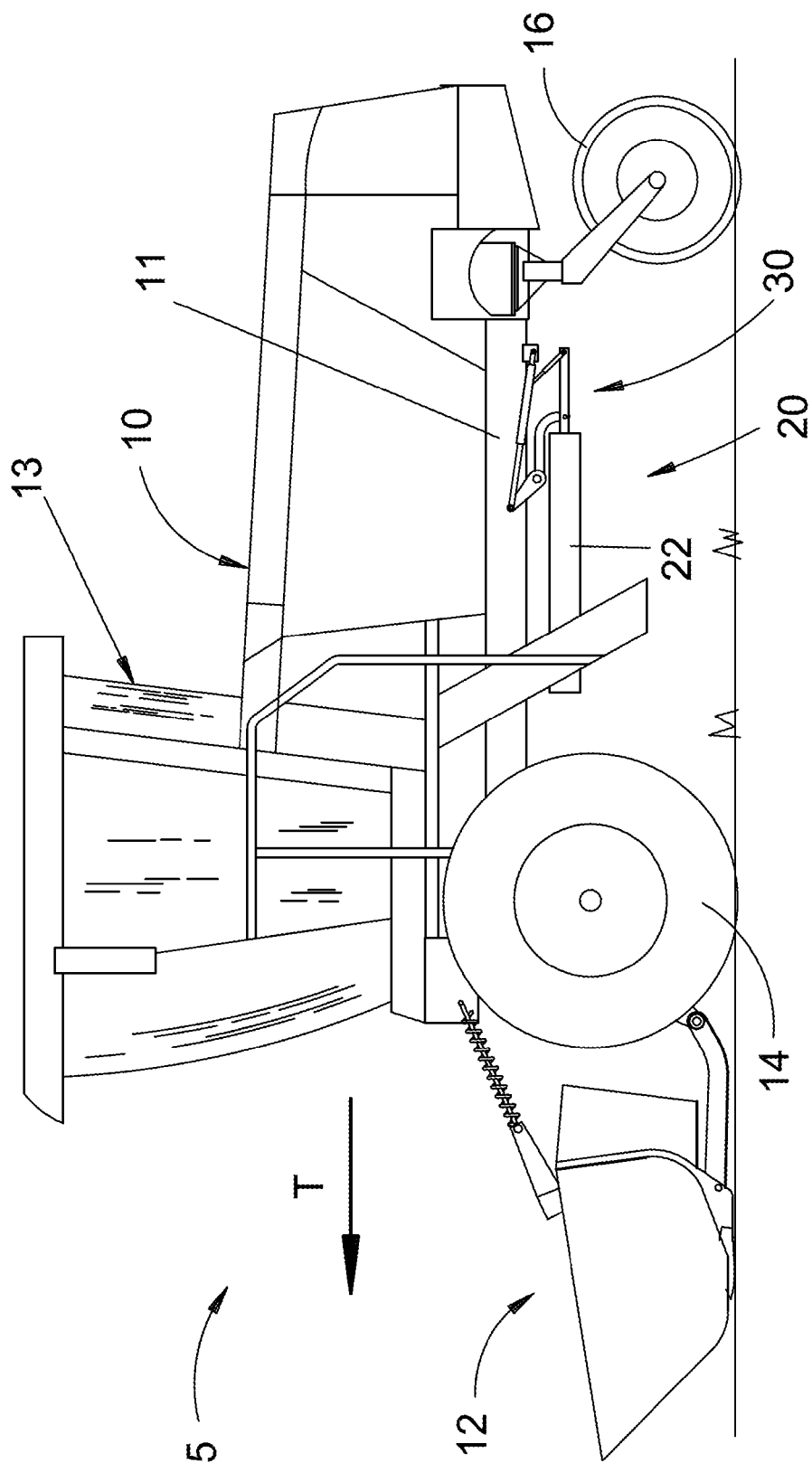
FIG. 1 is a side elevation view of a typical self-propelled windrower of the type on which the present invention is useful.

FIG. 1 shows a side view of a typical self-propelled windrower 5 used for harvesting a crop material as it travels across the ground in the direction indicated by arrow "T." Usually, a tractor 10 pushes a header 12 which severs the crop material from the ground, usually by a sickle-bar, rotary cutter or other functionally equivalent cutting means. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting means (not shown) in the leading edge of the header and falls rearwardly into the header. The crop material is urged toward the center of the header where it may be conditioned prior to discharge from the header. The crop is then ejected rearwardly from the header 12, generally in the space between the drive wheels 14 whereupon it falls to the ground. Shields (not shown) are used to arrange the crop into a windrow that is formed generally along the longitudinal axis of the windrower.

Windrower 10 also includes a merger apparatus 20 which is disposed under chassis 11 for directing crop material being discharged from header 12 to a location laterally displaced from the longitudinal centerline of the windrower 5. In this manner, windrows of harvested crop material may be positioned for merging with the harvested crop material from a previous separate pass by the windrower, usually when the windrower travels in the opposite direction along an adjacent path. Unlike known merger mechanisms in which the merger is fixed in relationship to the tractor chassis 11 and must be manually removed if traditional single-pass windrowing is desired, the present invention includes a lift mechanism 30 that enables the merger apparatus 20 to be selectively positioned in a working position for windrow merging operation, and also in a non-working position for forming windrows that trail behind generally along the windrower longitudinal centerline.

Figure 2:
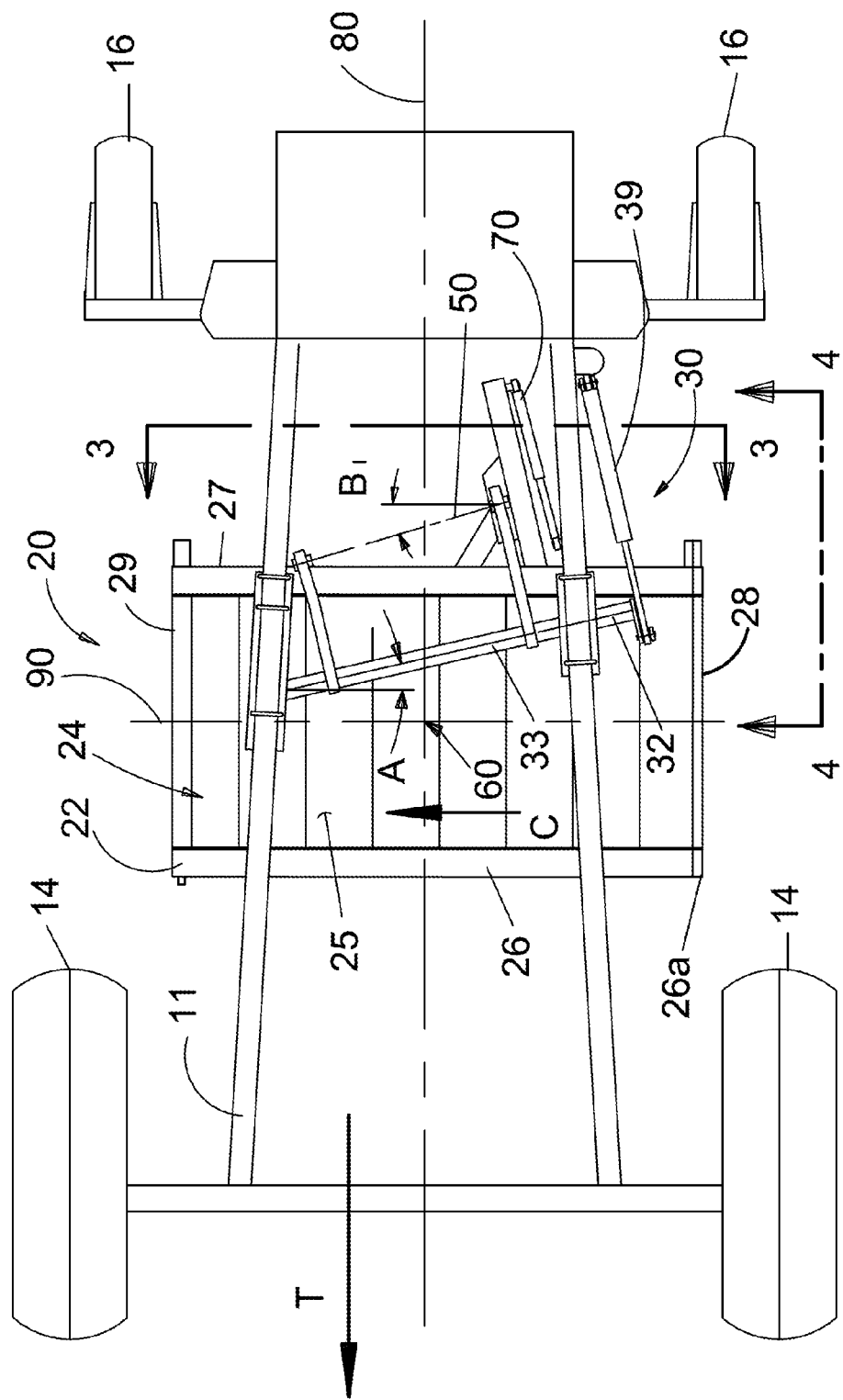
FIG. 2 is a partial plan view of a windrower chassis having an attached merger apparatus using the merger lift mechanism of the present invention, showing the merger apparatus in a non-working position.

Referring to FIG. 2, a plan view of a portion of the chassis 11, the merger apparatus 20, and the lift mechanism 30 of the present invention shown in the non-working position or raised position. When in the non-working position, the merger apparatus 20 is positioned rearwardly and upwardly to the extent possible to allow the flow of crop material being discharged from the header 12 to fall to the ground generally behind the header and along the longitudinal centerline axis 80 of the windrower without impinging upon the merger apparatus 20. The conveyor axis 90 of the merger 20 is transversely aligned, being generally perpendicular to the longitudinal axis 80 of the windrower to provide compact storage when in the non-working position.

The merger apparatus 20 comprises a generally rectangular movable frame 22 supporting an endless loop-style conveyor 24 for moving crop material generally laterally with respect to the direction of travel (shown as arrow "C"). Rotational energy for the conveyor is typically provided by a hydraulic drive means (not shown). Movable frame 22 includes forward and rearward edge members 26, 27, respectively, and generally opposing first and second frame ends 28, 29, respectively arranged in a generally rectangular arrangement for supporting a working (the upward facing) surface of conveyor 24 such that it is generally planer. The surface 25 of conveyor 24 may feature raised ribs or other protrusions for engaging the crop material and urging it in a direction generally parallel to the conveyor axis 90.

Figure 3:
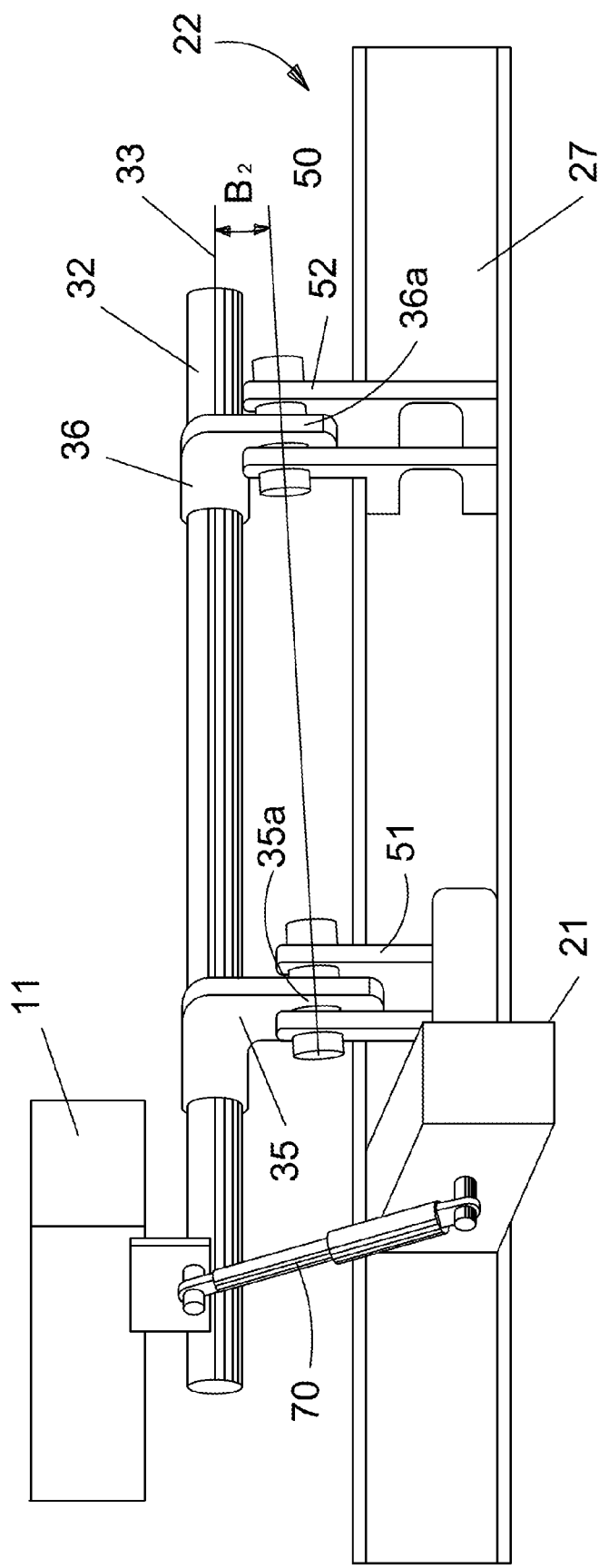
FIG. 3 is an elevation view of the present invention shown in FIG. 2, taken along line 3-3 showing the merger lift mechanism.
Figure 4:
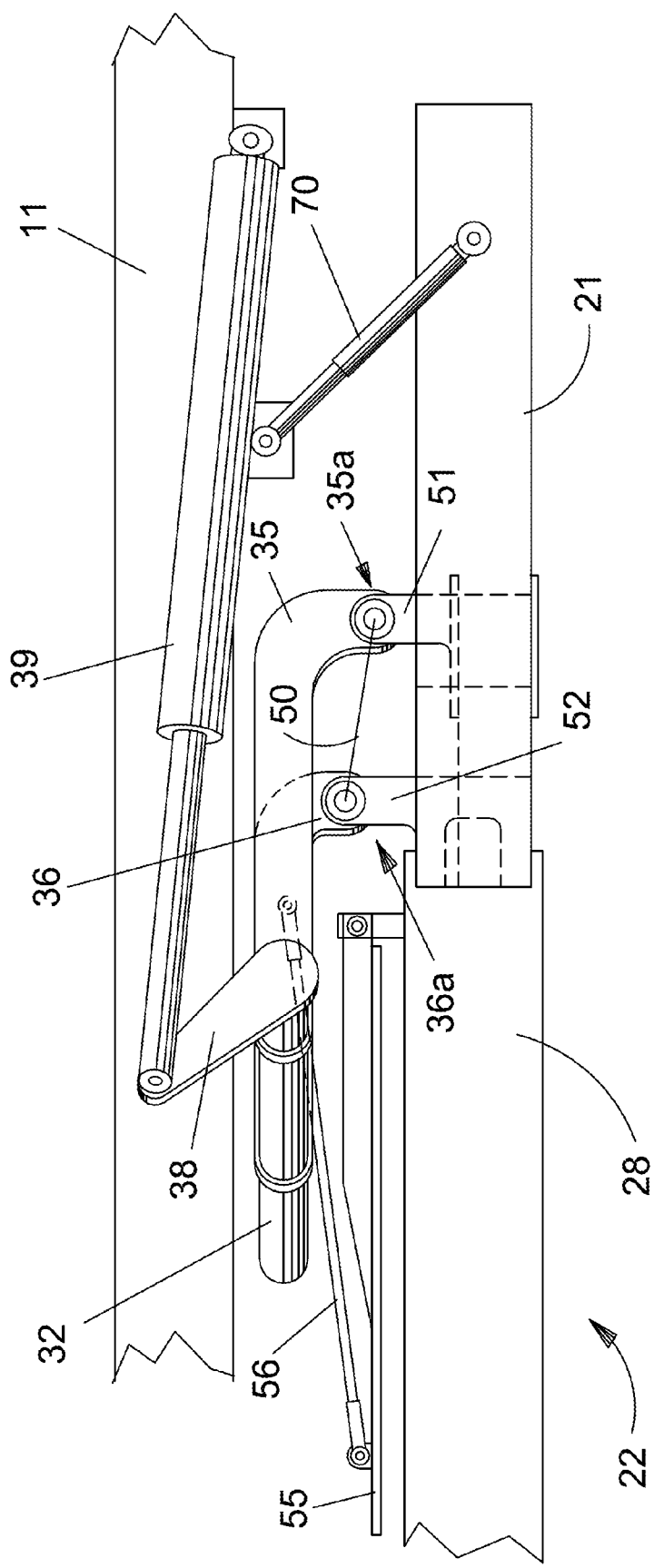
FIG. 4 is an elevation view of the present invention shown in FIG. 2, taken along line 4-4 showing the merger lift mechanism.

Referring now to FIGS. 2-4, the lift mechanism 30 comprises a lift shaft 32 which is rotationally connected to chassis 11. Lift shaft 32 rotates about a lift shaft axis 33 which is skewed with respect to chassis 11, being offset from the chassis transverse by a first angle indicated as "A" in FIG. 2. Actuator 39, typically a double-acting hydraulic cylinder, is connected to lift shaft 32 by a lever arm 38 such that extension and retraction of actuator 39 causes rotation of lift shaft 32 between opposing first and second positions. In the embodiment shown, extension of actuator 39 rotates lift shaft toward the first position which corresponds to the non-working or raised position of the merger apparatus 20. Retraction of actuator 39 rotates lift shaft 32 toward the second position which corresponds to the working or lowered position of the merger apparatus 20. As one skilled in the art would recognize, there are numerous means possible to rotate lift shaft 32 between opposing positions to accomplish the same objective as the actuator described herein. Such alternative means are contemplated within the scope of the present disclosure.

First and second lift arms 35, 36, respectively, are connected to lift shaft 32 such that they extend radially from the shaft and move through an arc as the lift shaft 32 is rotated. First lift arm 35 and second lift arm 36 are elongate members, each having a connection end for connection to lift shaft 32, and a pivotal end distally opposed to the connection end. Each pivotal end includes a pivotal connection 35a, 36a which is separated from the connection end by a radial distance therebetween. First and second lift arms 35, 36 have differing lengths such that the radial distance of first lift arm 35 is greater than the radial distance of second lift arm 36. The differences in radial distances causes a rotation of the movable frame 22 about a rotational axis 60 which is generally perpendicular to the plane of the working surface of the merger conveyor 24 as the lift shaft 32 is rotated between its first and second positions.

First and second lift arms 35, 36 may be configured to provide clearance for portions of the merger apparatus during movement or when positioned in either the working or non-working positions. As can be seen in FIG. 4, use of a L-shaped member for the lift arms 35, 36 allows a portion of the lift arms to be positioned horizontally with the leg portion of the lift arms extending downwardly which allows the merger apparatus 20 to be positioned in close proximity to the lower portion of chassis 11 thereby maximizing the ground clearance under the merger apparatus 20 when in the non-working position.

First and second pivotal connections 35a, 36a, on the lift arms are pivotally connected to bosses 51, 52 on movable frame 22. The pivotal connection is aligned on a pivotal axis 50 which is skewed with respect to lift shaft axis 33 (shown as angle B1 in FIG. 2) and also with respect to the plane of the conveyor 24 surface (shown as angle B2 in FIG. 3). Skewing of the pivotal axis as shown by angle B2 also causes the plane of the conveyor 24 on movable frame 22 to be tilted laterally as the lift shaft 32 is pivoted between first and second positions. The degree of skewing of pivotal axis 50 influences the amount of rotation about rotational axis 60 as the merger apparatus is moved between working and non-working positions.

The pivotal position of movable frame 22 about pivotal axis 50 is controlled by link 70 which connects between chassis 11 and a cantilever portion 21 of movable frame 22. The cantilever portion 21 extends rearwardly from rearward edge 27 of frame 22 such that the pivotal axis is positioned between the movable frame and the distal end of the cantilever portion. In the preferred embodiment, link 70 is an extensible link having a minimal compressed length necessary for controlling the pivotal position of movable frame 22 as the lift apparatus is moved between working and non-working positions. The length of link 70 may increase in response to load inputs on movable frame 22, which allows the forward edge 26 of movable frame 22 to pivot upward, such as when the merger encounters an obstacle as it travels across the ground.

Motion of the movable frame 22 and the working plane of conveyor 24 as the lift mechanism moves between non-working and working positions will be described in greater in connection with figures showing the apparatus in the working position.

Figure 5:
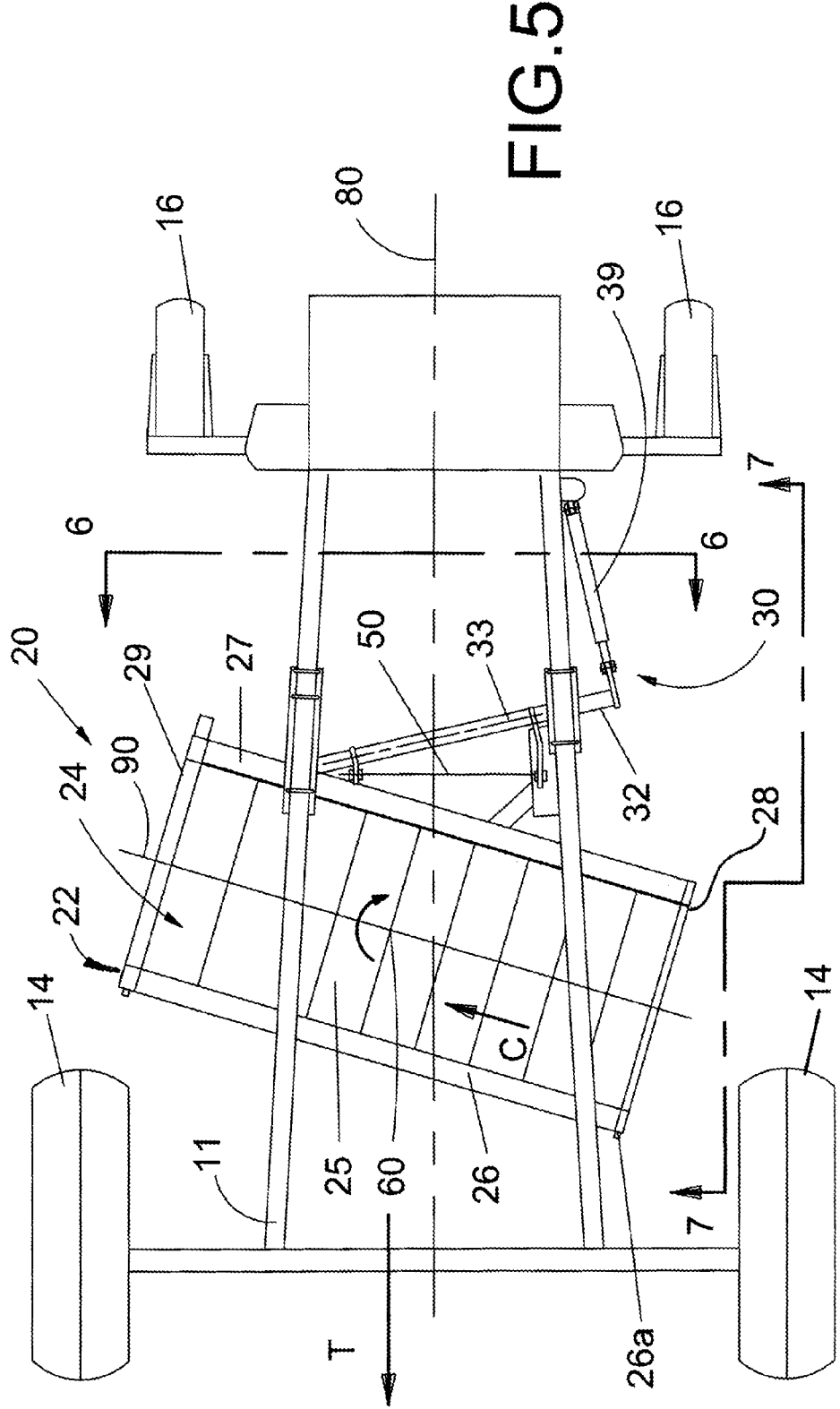
FIG. 5 is a partial plan view of a windrower chassis having an attached merger apparatus using the merger lift mechanism of the present invention, showing the merger apparatus in a working position.
Figure 6:
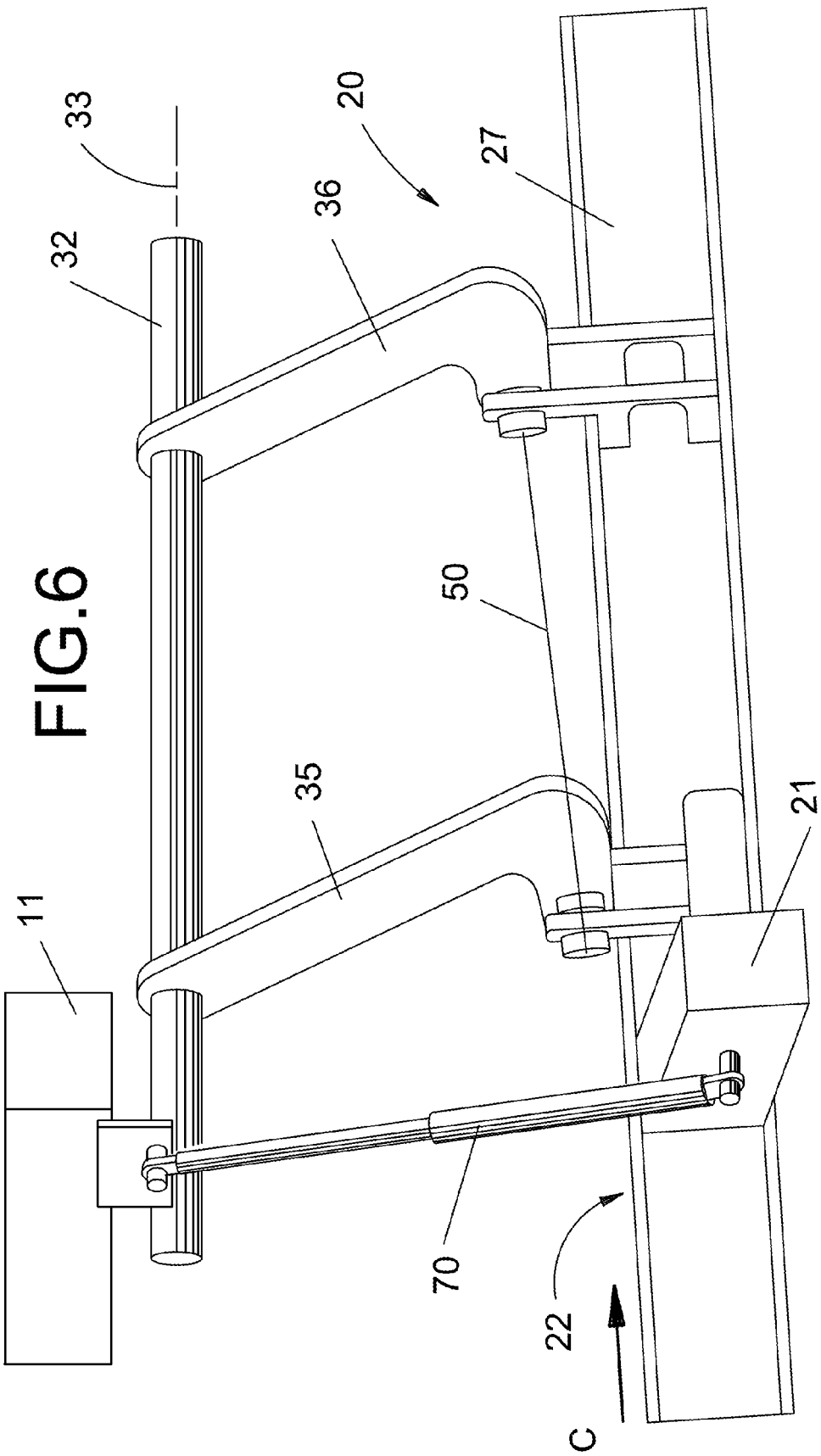
FIG. 6 is an elevation view of the present invention shown in FIG. 5, taken along line 6-6 showing the merger lift mechanism.
Figure 7:
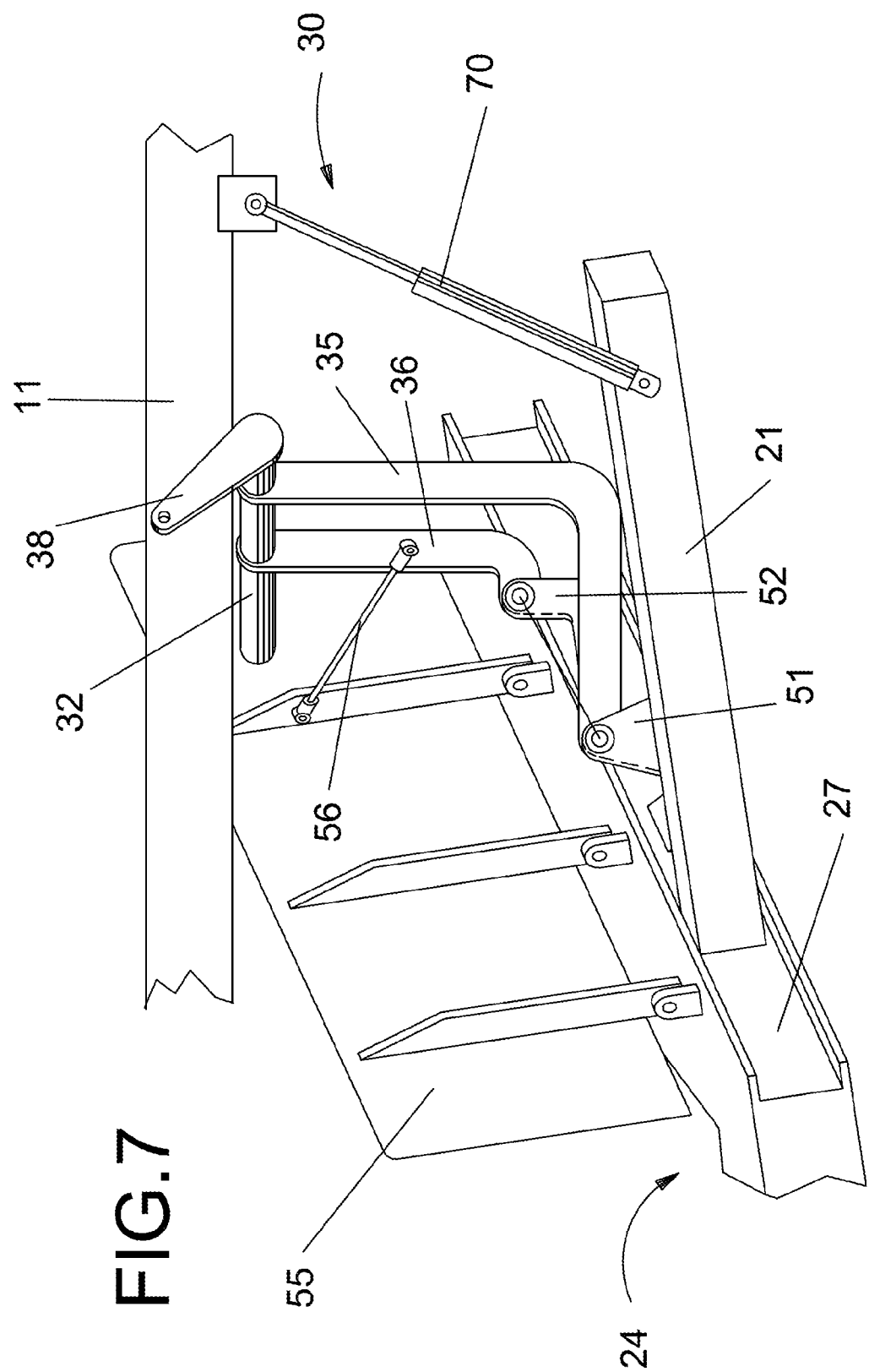
FIG. 7 is an elevation view of the present invention shown in FIG. 5, taken along line 7-7 showing the merger lift mechanism.

FIGS. 5-7 show the merger apparatus 20 in the working, or lowered position. During operation, conveyor 24 moves in the direction indicated by arrow "C" to carry crop material from the discharge of the header to a location laterally displaced from the windrower longitudinal axis 80. In order for the merger apparatus 20 to function effectively, it must be positioned closely behind the crop discharge point from the header and slightly below the discharge point such that crop material will fall onto the conveyor 24 whereupon it can be laterally transported. The lift mechanism of the present invention moves the merger apparatus in four distinct degrees of motion as is moves the merger from the non-working to the working position. The first is a general forward translatory motion which positions the forward edge 26 closer to the header crop discharge. The second is rotation of the merger apparatus about an axis generally perpendicular to the plane of the working surface of conveyor 24, shown as rotational axis 60. This rotational motion positions the leading corner 26a of the movable frame 22 closer to the crop discharge point than would be allowed by simple translatory motion of the merger. The third degree of motion is a lateral tilting of the merger conveyor such that the motion of the conveyor is slightly upward along the direction of travel "C" of the conveyor. The fourth degree of motion is pivoting about pivot axis 50 which lowers the forward edge 26 of the merger apparatus closer to the ground relative to the rearward edge of the apparatus.

Translatory motion of the merger apparatus is caused by rotation of the lift shaft 32 between first and second positions and the motion of the connected lift arms 35, 36. The lift shaft rotates in excess of 90 degrees when moving between the first and second positions. Lift shaft rotation causes the distal ends of connected lift arms 35, 36, and specifically first and second pivotal connections 35a, 36a, to swing through an arc. Movement of the pivotal connections 35a, 36a causes the merger apparatus, connected to the lift arms along pivotal axis 50, to move vertically with respect to the ground (i.e., lowered when moving from the non-working to the working position) and forwardly with respect to the tractor chassis 11.

It is noted that adjustment of the merger apparatus 20 working position can be accomplished by varying the rotational limits of the lift shaft 32. The capability for such adjustment is desirable to enable a single merger lift mechanism design to be used on a variety of windrower tractors or to accommodate variations in tractor dimensions, such as tire diameters. The capability to adjust the merger position, especially the limits of forward motion, is essential to optimally position the merger apparatus for operation on the windrower. One method contemplated for easily adjusting the merger working position is to limit the motion of actuator 39 in a manner so as to limit the degree of rotation of lift shaft 32. Those skilled in the art may devise other methods of accomplishing the same function; such methods are considered within the scope of the present invention.

Rotation of the merger apparatus 20 about an axis generally perpendicular to the plane of the merger conveyor surface is caused by the different lengths (and hence radial distance) of the first and second lift arms. As first lift arm 35 has a larger radial distance than does second lift arm 36, first lift arm 35 will cause one end of the merger apparatus 20 to move forward to a greater extent than the other end which is moved by second lift arm 36. A shown in FIG. 5, the right end 28 of the merger 20 is positioned further forward, with respect to the windrower, than the left end 29. Rotation of the merger apparatus is necessary for clearance with the drive wheels 14 while positioning a portion of the merger apparatus in close proximity to the crop discharge. Without this rotation, the transverse dimension of the merger apparatus would interfere with the drive wheels before the forward edge 26 could be positioned sufficiently close to the crop discharge point. The rotation of the merger apparatus allows the left forward corner 26a of the merger apparatus to be positioned closer to the crop discharge location than would otherwise be possible. Further contributing to the rotation of the merger apparatus is the angular skewing of the pivotal axis 50 with respect to the conveyor axis 90, shown as angle B1 in FIG. 2.

Lateral tilting of the merger apparatus 20 is controlled by the inclination of the pivot axis 50 with respect to horizontal, shown as angle B2 in FIG. 3. Lateral tilting is also influenced by the differences in radial lengths of the lift arms 35, 36 which control the position of first and second pivotal connections 35a, 36a when the lift mechanism 30 is in the working position. Lateral tilting provides a slight upward trajectory of crop material as it is moved by conveyor 24 so that the crop material may be forcefully discharged from the merger apparatus to position the resultant windrow appreciably beyond the right end (discharge end) of the merger apparatus 20. Without this tilting motion, the drive speed of the conveyor 24 would have to be increased to provide suitable crop material discharge distance capability for the merger. Additionally, the lateral tilt of the merger conveyor increases the loft of the crop material being discharged which, in turn, improves the fluff of the resultant windrow thereby improving crop drying. A conventional discharge deflector apparatus (not shown) may also be employed at the discharge end of the merger apparatus to vary the lateral displacement of the result windrow.

Pivotal tilting of the merger apparatus 20 about pivot axis 50 lowers the forward edge 26 of the plane of the merger conveyor 24 with respect to the rearward edge 27. The pivotal tilting allows the forward edge 36 of the merger to be positioned closer to the ground than would be otherwise possible without pivoting and better positions the merger apparatus 20 for collecting crop material discharged from the header. When in the non-working position, this pivotal motion positions the working plane of the merger apparatus generally horizontally to maximize ground clearance and thus clearance for crop material. Pivotal tilting is controlled by extensible link 70 which is connected at one end to cantilever portion 21 of the merger apparatus frame and at the opposing end to the chassis 11. Extensible link 70 has a length that may vary, but has a pre-determined minimum length. Normal weight of the merger apparatus acting on the merger lift device places the link under a compressive load. As the lift device is moved between non-working and working positions, the extensible link 70 acting on the cantilever portion 21 allows the forward edge 26 of the merger to pivot downwardly.

In the event that the forward edge of the merger encounters an obstacle as the windrower proceeded across the ground, extensible link 70 extends (lengthens) to allow the merger to pivot and the forward edge of the merger frame to rise above the obstacle. After passing over the obstacle, gravity acting on the merger apparatus will cause the extensible link 70 to return to its predetermined minimum length and allow the merger to pivot back to its working position. If the obstacle is sufficiently large or abrupt such that pivoting of the merger frame alone provides insufficient clearance, the merger lift device may be allowed to momentarily translate rearwardly and upwardly toward the non-working position to provide additional clearance. Such protective capability is easily accomplished by limiting hydraulic pressure in the control circuit for actuator 39.

Figure 8:
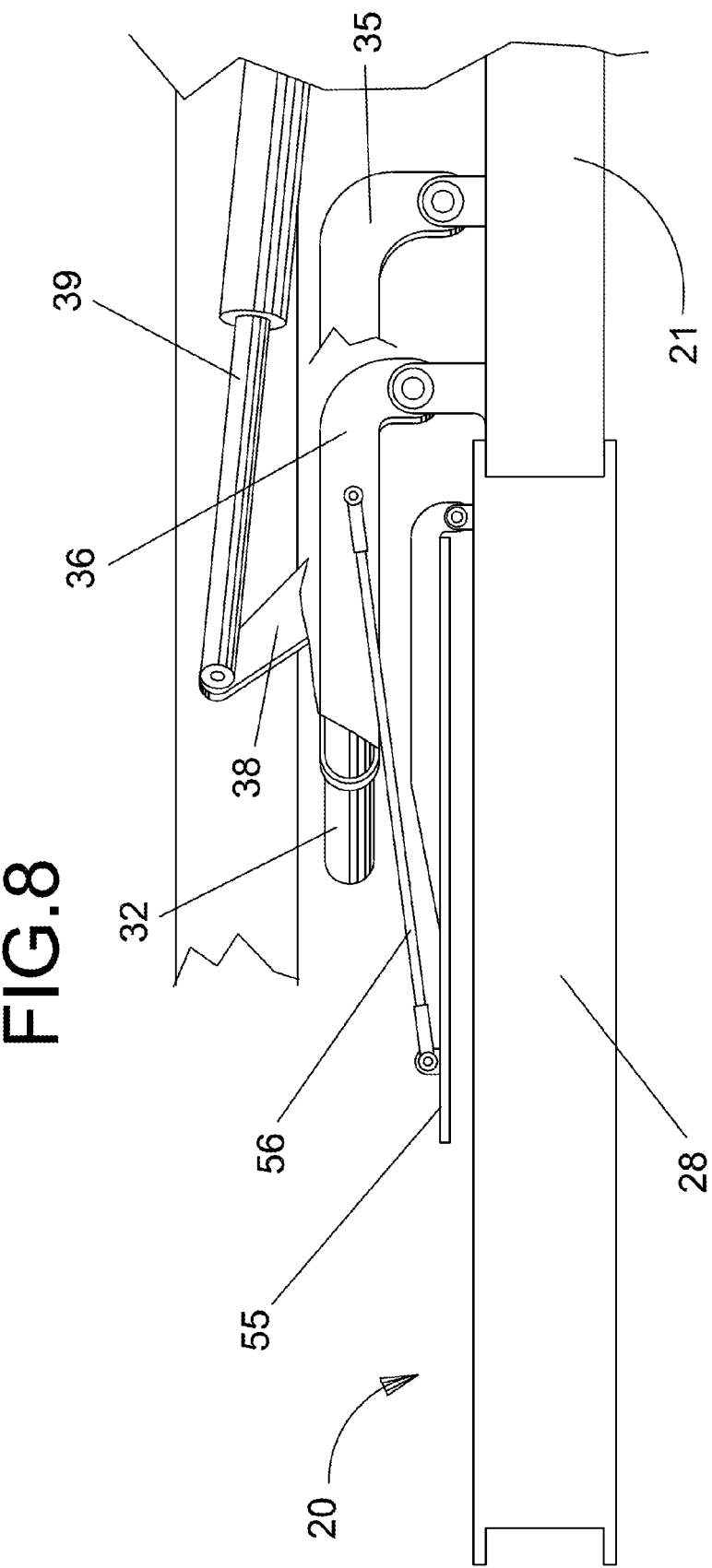
FIG. 8 is a side elevation view of the present invention showing a crop deflector position when the merger apparatus is in the non-working position.

Now referring to FIGS. 7 and 8, merger performance is enhanced through the use of a rear deflector 55 which prevents crop material from passing across the merger conveyor surface and falling from the rearward edge of the merger to the ground. The rear deflector extends upwardly from the rear edge 27 of the merger. In order to allow the merger apparatus 20 to be positioned close to the tractor chassis when in the non-working position, the rear deflector is hinge connected to the merger frame. In one embodiment, the vertical position of the deflector is controlled by a rigid tie-member 56 connecting the deflector 55 and a frame member, either one of the lift arms (35 or 36) of the lift device 30, or the tractor chassis 11. As the merger moves toward the non-working position, the tie-member 56 moves the deflector 55 forwardly and folds it adjacent to the surface of the merger conveyor thereby minimizing the overall height of the merger. As the merger is moved toward the working position, the tie-member 56 moves the deflector 55 to a generally vertical position where it functions to prevent crop material from being discharged from the rear edge of the merger conveyor. An alternate embodiment replaces the rigid tie-member 56 with a tension-only tie-member which raises deflector 55 into the vertical position as the merger moves toward the working position. As the merger is moved toward the non-working position, tension is relieved on the tension-only member 56 which allows the deflector 55 to move to the horizontal stowed position by the force of gravity or by other means such as a bumper.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An apparatus for selectively positioning a merger connected to a chassis of a windrower, the windrower having a longitudinal axis, said apparatus comprising:
   a merger having a forward edge, a rearward edge, first and second opposing ends, and a conveyor disposed therebetween, said conveyor having at least one generally planar working surface, and a directional axis defined by a direction of crop material movement from said first end toward said second end by said conveyor, said merger being selectively movable between working and non-working positions;
   a lift shaft connected to said chassis and having an axis of rotation;
   at least first and second elongate lift arms connected at one end to said lift shaft for arcuate movement by said lift shaft, each said lift arm having a pivot connection distally away from said lift shaft, said lift arms being asymmetric to each other;
   a pivot axis aligned in a skewed relationship to said lift shaft axis of rotation;
   at least first and second connections pivotally connecting said pivot connections of said at least first and second lift arms and said merger, said at least first and second connections aligned on said pivot axis;
   an actuator connected to said lift shaft wherein actuation of said actuator causes said working surface to be moved in four distinct degrees of movement as said merger moves between said non-working and said working positions.

2. The apparatus of claim 1, further comprising an elongate control link interconnecting said chassis and said merger for managing pivotal movement of said merger about said pivotal axis.

3. The apparatus of claim 2, wherein said control link is configured to allow upward movement of said merger.

4. The apparatus of claim 2, wherein said first degree of movement is translation of said merger along an axis generally parallel to said longitudinal axis and said merger moves from a upper and rearward position to a lower and forward position.

5. The apparatus of claim 4, wherein said second degree of movement is rotation of said merger about an axis generally perpendicular to the plane of said working surface.

6. The apparatus of claim 5, wherein said third degree of movement is tilting of said working surface so that said first end is lower than said second end.

7. The apparatus of claim 6, wherein said fourth degree of movement is pivoting of said working surface about said pivotal axis such that said forward edge is lower than said rearward edge.

* * * * *